United States Patent [19]

Leman

[11] 4,076,212
[45] Feb. 28, 1978

[54] STRETCH SEAL VALVE

[76] Inventor: Arthur L. Leman, 10340 Wallisville Road, Houston, Tex. 77029

[21] Appl. No.: 776,120

[22] Filed: Mar. 10, 1977

[51] Int. Cl.² .................... F16K 1/38; F16K 15/02
[52] U.S. Cl. ................................ 251/332; 251/357; 137/DIG. 3; 137/516.29
[58] Field of Search .............. 137/516.29, DIG. 3; 251/332, 333, 334, 357

[56] References Cited

U.S. PATENT DOCUMENTS

| 1,111,319 | 9/1914 | Paulsmeiel | 137/DIG. 3 |
| 1,654,772 | 1/1928 | Akeyson et al. | 251/357 X |
| 1,716,896 | 6/1929 | Miller | 137/DIG. 3 |
| 1,844,159 | 2/1932 | Hammer | 137/DIG. 3 |
| 2,903,235 | 9/1959 | Rodgers et al. | 251/357 X |
| 3,092,139 | 6/1963 | Rodgers et al. | 251/332 X |
| 3,202,178 | 8/1965 | Wolfe | 251/357 X |
| 3,409,039 | 11/1968 | Griffin | 137/516.29 |
| 3,742,976 | 7/1973 | Bailey | 137/516.29 |

Primary Examiner—William R. Cline
Attorney, Agent, or Firm—Robert A. Townsend

[57] ABSTRACT

An improved valve for high speed, high pressure pumps, having a dished, rectangular-sectioned, radially stretched seal overhanging the valve body to both cushion and seal the body's closure against the valve seat, and which is pre-stressed in tension sufficiently to stiffen against pinch off under the high fluid pressures of, and to attain full elastic shape recovery in the very brief time interval between the valve closings of, such pumps.

8 Claims, 6 Drawing Figures

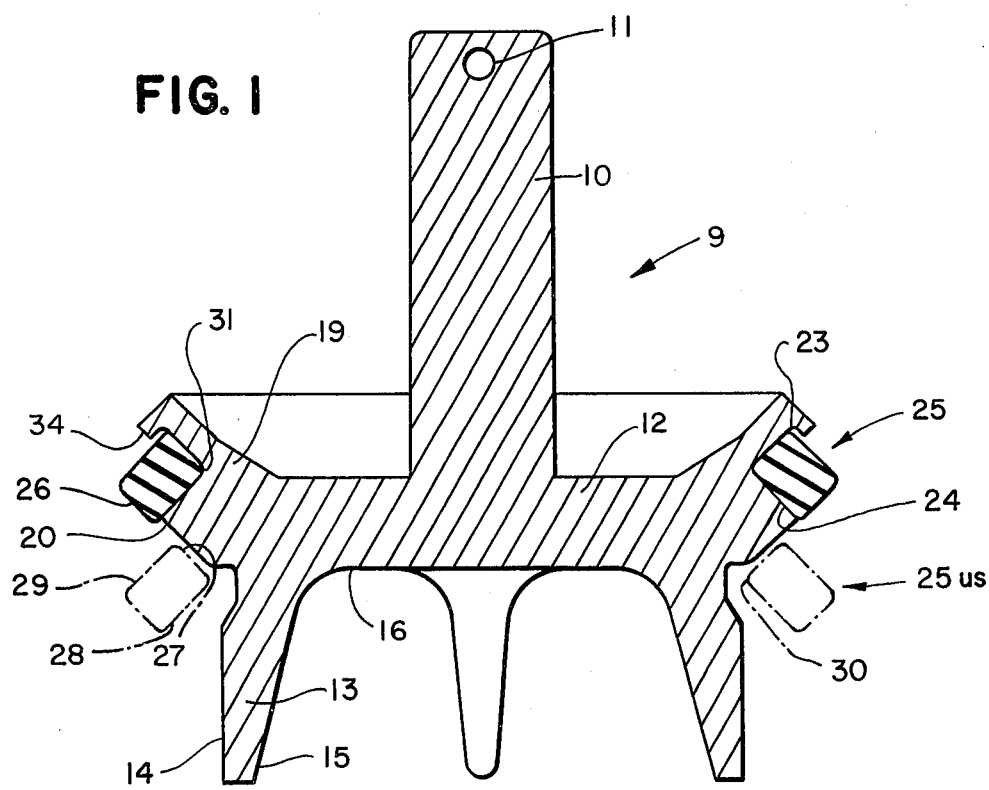
FIG. 1
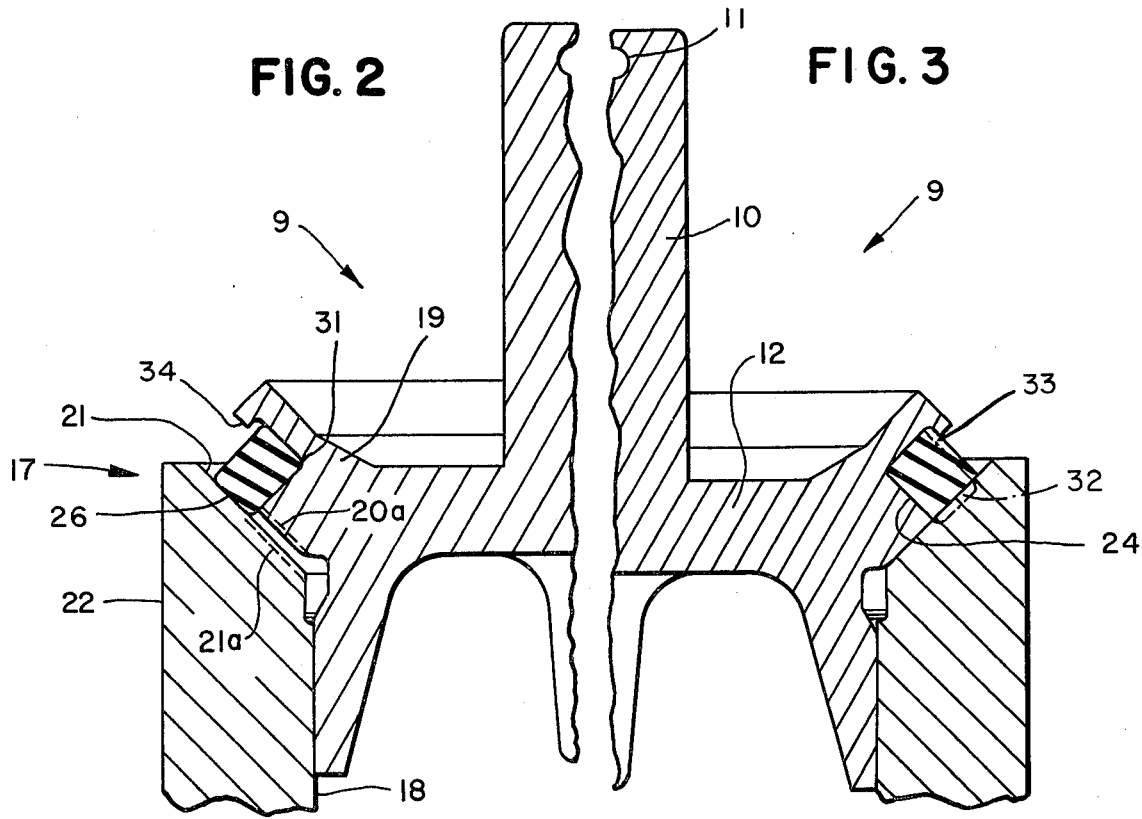
FIG. 2
FIG. 3

STRETCH SEAL VALVE

BACKGROUND OF THE INVENTION

In recent years there have been developed, particularly for oil field or oil well drilling applications, improved, high speed, high pressure, single acting pumps, or slush pumps.

These new pumps run up to, or operate as fast as, 200 revolutions per minute, or more, which means or requires that the valves of these pumps must be capable of cycling, or opening and closing, more than three times a second.

The new pumps also operate under extremely high fluid pressures in the heighborhood of 5,500 pounds per square inch (5,500 PSI) or more. At that pressure the overall load on top of a typical, say 4 in. I.D. valve, having a complete top area of two times the cross-sectional area of its seat, would be 100,000 pounds (100,000 lbs.).

The extreme high speed and pressure conditions of the new single acting pumps have introduced or brought with them a variety of new problems relating to the seals and sealing of, and to the wear or life of, the pump valves.

One problem with the new pumps arises from their very rapid operation, at better than three cycles per second, and whereby the pump valves can in continuous operation experience or undergo as many as a million closings in only about a month's time.

The problems created by the described continuous, high speed, high pressure valve cycling are those of rapid and excessive wear of the valve body and seat faces; of like wear of the valve seals; and of the latter compounding the former.

The conventional or prior valves, that have been attempted to be employed with the new pumps, are generally understood, then, to be subject to excessive or too rapid wear at the metal faces of both the valve body and the valve seat.

Thus it has been recognized as well that, by the overcoming or elimination of the metal wear problem, the operating or useful life of the valves could be significantly extended.

Such valves life extending is, of course, of the utmost significance, or economic benefit.

That benefit is measured in part by the significant reduction to be achieved in the very costly down-time or shutdown of the pumps for the valve repair, and in further part by the very large savings to be made in the substantial labor and material expense of the wear-necessitated change or replacement both of the valve body and of the valve seat.

Applicant has found that the solution to the foregoing problem lies in the adequate provision by the valve seal of each or both of the double functions of cushioning and of sealing the valve closings. As to the cushioning, it has been determined more particularly that the valves here concerned need or require to be significantly slowed in the final, say 1/16 in. of their travel to or descent against the valve seat.

Only by the adequate cushioning can the excessive wear of the valve body and seat faces by the very rapidly repeated, high impact, valve-to-seat engagement, and the described attendant problems of pump maintenance and service interruption, be successfully prevented or guarded against.

Applicant has analyzed the problem of cushioning the high speed, high pressure slush pumps, and from that discovered that the following six conditions must be met, to enable the requisite adequate cushioning to be supplied:

1. The seal must be conical, must be a paralleling, contiguous, upstream extension of the valve body seating face, and must have full, flat seating engagement against a like-tapered conical seating face of a valve seat that extends both outwardly of the seal and inwardly to fully oppose also the valve body seating face.

2. There must be a sufficient, but not excessive, overhang of the seal, or extending of it outwardly of or below the metal seating face or surface of the valve body.

3. The valve seat face, the seal-backing valve body groove face, and the overhanging valve seal face must all parallel each other, whereby the valve seal is uniformly compressed throughout its cross-section in the course of the valve closing.

4. There must be rigid back-up of the valve seal by the valve body during the course of the valve seal compressing by the valve closing, this without any upward deflection of the valve body during the valve closing, and whereby the compressive impact of said closing is initially taken up or absorbed wholly by, and therefore is fully resisted by, the valve seal.

5. The valve body groove must be sufficiently wider than the valve seal to accommodate therewithin the valve seal volume that is displaced from the seal overhang upon the seal's compression to within the plane of the valve body seating face.

6. In order to return to its full normal or uncompressed shape or depth within the very brief time interval between successive valve closings, the valve seal must have an elastic return or shape recovery rate which is higher or faster than that characteristic of or normally attainable with the rubber or rubberous materials that are suitable therefor.

The valve seal and valve body constructions and arrangements of the prior art that have heretofore been tried with the new high speed, high pressure slush pumps have failed to solve the problem, and more particularly have not supplied in combination the foregoing requirements that applicant has discovered to be necessary.

The seals of certain prior art valves have been backed by a relatively thin plate on top of the seal. Such thin plate is found to have deflected under the valve closing impact, and to have thereby prevented the required cushioning or slowing down of the final 1/16 in., or thereabouts, of the valve's descent, through its yielding to, and non-rigid backing of the seal against and for proper compression under, the closing impact.

Applicant has also found, as above noted, that the normal resiliency or elasticity of the rubber or rubberous seal materials will not allow or afford full elastic recovery, or return to full extended shape, rapidly enough for these modern pumps, or within the ⅓ second or less time interval between their successive valve closings.

In certain prior art valves, again, the valve seat face, valve-seal-backing groove face, and intervening valve seal face have not been parallel. The valve seal hence has not been of uniform cross-section, and the seal has therefore not been uniformly compressed throughout its length and width in the valve closing, and with the result that there has not been the requisite or maximum cushioning by, and for or within the necessarily limited protrusion of, the seal.

This invention novelly solves the foregoing cushioning problem, and more particularly fully satisfies all the above enumerated requirements thereof.

The second operative requirement of the high speed, high pressure slush pump valve seals, namely, that of sealing the pump valves, represents yet another unsolved problem of the special sealing application here concerned.

The problem is that, At the initial instant of valve closing, seal-to-seat contact, before the seal has been compressed to where come into contact also the metal valve body and seat surfaces, the 5,500 or so PSI pressure on the seal tends to downwardly-inwardly force or flow, or "pinch-off" the seal. And when that point in the valve life is reached that the case-hardened metal surfaces of the valve body and seat are worn away, the rate of metal wear becomes excessive, the clearance between the valve body and seat surfaces (at the aforesaid initial seal contact) increases, and the tendency to "pinch-off" becomes greater.

Further, when the "pinch-off" has progressed to a certain percentage of the sealing side, the rubber will distort and not seal off.

The "pinch-off" then, both shortens the life of the seal and renders the valve inoperative, in that the seal must seal off completely against any leakage of the abrasive fluid, which would of course cause the metal to cut out.

This invention uniquely relieves the foregoing sealing problem, as well as and in conjunction with its resolution also of the cushioning problem hereinbefore described.

SUMMARY OF THE INVENTION

Slush pump valve having opposed, parallel-tapered metal body and seat faces, and within said faces an annular valve body groove having a like-tapered back wall and an inner side wall generally normal or at right angles thereto.

Stretched into the groove is a rectangular-section rubber seal ring dished so that its back and front faces parallel the taper of the groove back and the engaging metal valve body and seat faces.

The seal ring has a depth to overhang the valve body and thereby cushion the body's closing against the valve seat.

The stretching of the seal so pre-stresses it in tension as to speed its elastic recovery to become full within the very short time interval between the valve closings, and as to so stiffen it against the very high fluid pressures acting on the valve as to resist deflection or "pinch-off", and thereby to wear longer and seal the valve better.

The confinement of the seal by the body groove and the bodyseat engagement is such as to obtain in the valve closing a uniform compression over the entire cross-section of the seal, and to generate an expansion of the full compressed volume that is only outward, or entirely in the upstream direction.

BRIEF DESCRIPTION OF THE DRAWINGS

In the drawings illustrating a preferred embodiment:

FIG. 1 is a vertical section of the valve, and shows in dash line also the dimensioning or diameter which the seal has in its relaxed or unstressed state prior to its stretching assembly with the valve body;

FIG. 2 is a left half vertical section of the valve at the instant of initial closing contact of the seal with the valve seat;

FIG. 3 is a right hand vertical section of the valve following closing compression of the seal to bring also the valve body and seat into tapered face engagement.

DESCRIPTION OF THE PREFERRED EMBODIMENT

Figure 4A:
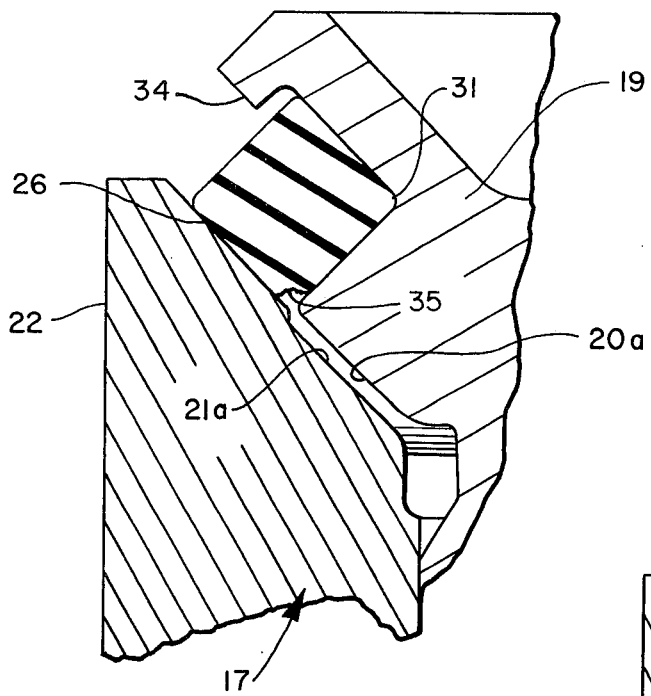
FIGS. 4a, 4b, and 4c illustrate the "pinch-off" problem that is alleviated by the invention.

In the preferred embodiment shown, a rigid, integral, annular, metal valve body 9 has an elongated vertical central stem 10 and opening 11 therethrough for engagement by a valve actuator. Stem 10 extends downwardly to merge with and at the hub or center of an annular, lateral or horizontal projecting mid-portion or waist 12.

From the outer periphery of the waist 12 depend a usual number, say four, of guide feet or fingers 13 having cylindrical outer surfaces or faces 14 and inner sides or walls 15 that taper upwardly inwardly to merge with the waist bottom side or face 16.

The valve body 9 is received within and also has tapered or conical face engagement with a valve seat 17 having a cylindrical inner wall 18 with which the body fingers 13 are in smooth sliding contact, when the valve body 9 is reciprocated relative to and coaxially with the valve seat ring 17 by pump actuator means that may engage body opening 11, but that are not part of the invention and therefore not shown. With the fingers 13, the invention valve is a "full opening" valve, whose seat bore 18 has no bridge to retard the fluid flow, and such as often prevents filling to capacity.

Above the fingers 13, the valve body extends upwardly-outwardly of the waist 12 by an integral flange or wing portion 19 having an annular, conically tapered, upwardly inwardly facing, flat metal seat face 20 that is inclined at, said 45°.

The integral annular metal valve seat 17 has an annular conically tapered, downwardly outwardly facing, flat metal seat face 21 that projects upwardly-outwardly in parallelism with the body face 20, thus also having a taper or conicity of about 45°.

The tubular seat ring 17 has a cylindrical outer wall 22 of a diameter such that before intersecting it the seat face 21 projects upwardly-outwardly beyond the O.D. of the valve seal when that is upwardly-outwardly expanded.

The valve body seat face 20 extends uninterruptedly from its inner end for, say half the length of seat ring face 21. Therebeyond the body 9 is formed in its wing portion 19 with a wide, deep, annular recess or groove having a straight or flat back wall 23 tapering or inclined in parallelism with the seating faces 20, 21. The seal groove further has a straight or flat inner side wall 24 of, say ¼ in. depth and inclined at right angles to the back wall 23, or similarly at about 45° to the vertical, in the illustrated embodiment.

Received in the aforementioned body groove is a rubber or rubberous ring or seal 25 which is rectangular in cross-section, and which is molded in the dished or canted form shown, or with its front and back surfaces 26 and 27 inclined in parallelism with, or with the taper of, the seating faces 20, 21 and groove back wall 23, and with its inside and outside surfaces 28, 29 inclined in parallelism with the inside surface 24 of the seal groove.

The seal 25 inside face 28 may if desired be cemented to the engaged face 24 of the seal groove.

Under the invention, the seal ring 25 is molded to have a normal or relaxed or unstressed proportion, as shown dash line at 25$_{us}$ in FIG. 1, which is critically smaller than, or at least ¼ in. smaller in I.D. than, that of the groove.

While the seal cross-section is shown as approximately square, there is no necessary relationship of its width to its depth.

On the other hand, it is found that, at least on all present slush pump valve sizes, which may range approximately 3 to approximately 6½ in. valve seat I.D. at wall 18, the inside diameter 30 of the relaxed or as-molded seal should be ¼ in., or more, less than the inside diameter 31 of the seal groove, to bring about the wanted pre-stressing in tension which, along with the confinement of the rubber flow upon the seal compression only to and all around on the upstream or outward side, brings about the invention valve's unique ability to cushion the very rapid closings and seal the very high pressures here concerned.

In the assembly of the seal ring 25 to the valve body 10, the ring is first passed over the fingers 13 to the 25$_{us}$ position, and then expanded or stretched as with a suitable tool outwardly along the face 20 and all the way past the intersection therewith of the groove face 24, whereupon the seal elastically contracts into the groove as shown. As thus installed, and throughout the use and operation of the valve, the invention seal is calculatedly pre-stressed in tension, by its stretching to the at least ¼ in. greater diameter of the groove.

The illustrated seal 25 has a thickness of 9/16 in. and therefore protrudes or has an overhang of 1/16 in. out of or beyond the seal groove and the plane of the body seating face 20, this uniformly across the seal width by the seal front and back faces 26 and 27 being parallel with the groove back 23 and said seating face 20. Under the invention, the extent of the protrusion or overhang of the seal 25 may be from about 1/32 in. to about the aforesaid 1/16 in.

In the closing of the valve to engagement of the seating faces 20, 21 the seal 25 is compressed so that the seal front face 26 is forced back to the plane of the body seating face 20. In this the depth of the seal 25 is reduced from the same 9/16 to the groove depth of ½ in., and the 1/16 in. protruding or overhanging annulus or volume 32, FIG. 3, is necessarily flowed or displaced. The seal 25 being confined at the groove inside and back walls 24, 23, and being additionally or third-side confined during its described compression by the seat face 21, the displacement flow of the rubber can only be and entirely is outwardly. Thus in the valve seating the illustrated seal is widened by about 1/16 in., as represented by the expansion volume 33, FIG. 3.

The seal groove thus has a width sufficiently greater than that of the seal 25 to at least accommodate the latter's width increase herein by the volume 33. If there were not such initially excess groove width, the seal would be four-side confined, and there could not occur the outward or upstream flow of the seal which is essential to the combination cushioning and sealing function that it must perform under the extreme conditions here concerned.

Outwardly of the seal 25 the body wing or shoulder 19 is reduced in thickness, leaving thereat a relatively short, downwardly projecting annular rim or nose 34 that completes the seal groove, that only partially encloses the seal 25, and that does not engage the seat ring face 21.

It has already been pointed out that in the very high speed operation of the slush pumps, as fast as 200 rpm, the valve must open and close more than three times a second.

In the operation of the pumps each valve closing is cushioned, in the final portion of the valve body's seating travel, by the compression as described of the thickness of the seal 25 to eliminate or displace its overhang volume 32, and to replace that contraction by the upstream width expansion of an equal volume 33, as the seating faces 20, 21 are closed from the 1/16 in. overhang gap, FIG. 2, to their full final face engagement, FIG. 3.

The extremely rapid action of the new pumps here concerned renders the retention or providing of the cushioning function of the seal all the more necessary, to avoid or minimize too rapid or excessive wear of the metal seating means or faces.

As also explained above, one reason why that cushioning function has not heretofore been supplied is that the normal resiliency of rubber will not allow the seal to recover its shape quickly enough, or within the less than ⅓ second interval between the pump closings.

Under this invention the valve seal 25 is pre-stressed in tension, by the stretching of it from the dash line (25$_{us}$) to the solid line (25) position, FIG. 1, such that the seal is in circumferential tension around the two engaged sides 23, 24 of the groove.

The result is that the invention seal, by reason of its aforementioned stretching or pre-stressing in circumferential tension, manifests a critically different or more rapid rate of return or elastic recovery, and is thus enabled to resume its full thickness, or overhanging readiness for cushioning the next valve closing, within the less than ⅓ second time interval within which it is allowed to achieve such full shape recovery, in the described high speed pump operation.

Critical also to the successful operation of the valve is that the body wing 19 has sufficient mass or thickness to rigidly resist, and not give away to or deflect under, the compression of the seal 25. This in contrast to the prior art valves which, while claiming to have a cushioning seal, do not in fact so function because provided with a relatively thin plate on top of the seal that deflects under the impact or blow of the very rapid valve seating. The result of such thin plate deflecting or blow absorption is of course that the give or yielding under the impact or blow is not confined to the seal itself, and that the resultant softening of or non-cushioning by the seal causes the impact to be much more rapidly and fully felt and absorbed at the metal faces 20, 21 themselves.

The resultant rapid, excessive wear of the metal seating sufaces is exaggeratedly shown for illustration by the dash lines 20a, 21a, FIG. 2.

Noting again that the seating faces 20, 21, the groove back 23, and the seal faces 26 and 27 are all parallel, whereby the compression of the seal is uniform over its entire cross-section, the cushioning hereof is thus unreduced either by non-uniformity (between the inner and outer margins) of the seal thickness that is being reduced by the seating compression, or by the aforementioned deflecting or bending back out of parallelism of the seal groove back 23, as result of the valve body thereat having insufficient rigidity, as with the relatively thin plates on top of the seal that are found in certain prior art constructions.

The invention valve seal cushioning comprises also the pre-stressing in circumferential tension of the seal, in that the same stiffens the rubber against being forced, as it can only be, outwardly into the illustrated clearance space, or portion of the groove back or width that initially exists between the seal and the outer rim or flange 34, FIG. 1.

Such resistance to radial expansion of the seal, coupled or combined with its confinement otherwise within the seal groove, and also with the firmness or rigidity of the valve body thereat under the seating impact, assure the valve the wanted cushioning resistance to that impact, as well as the necessary accelerated rate of elastic recovery of spring back, as heretofore mentioned.

The further problem with the high speed valves arises from their having to withstand fluid pressures on the outside of the seal of very high order, or in the neighborhood of 5,500 PSI or more, as heretofore mentioned. The tendency of this great pressure is to flow or deflect the seal inwardly, into the clearance that exists between the seating and seat faces 20, 21 when only the seal overhang has closed or touched down against the seat face 21 to shut off the downward flow of the fluid under that great pressure, and before the metal seating surface 20 of the valve body 10, which seating surface 20 lags of course behind the seal 25, also has closed against the seat face 21. When such pressure causes deflection or inward flow of the seal, that results in its being "pinched-off", between the engaging seating and seat surfaces 20, 21; and when the "pinch-off" reaches a certain percentage of the front or sealing side 26 of the seal, the rubber will distort and no longer seal off.

The life of the seal being largely determined by the "pinch-off", the sealing problem with the prior art valves is in part that the "pinch-off" is accelerated, and the seal life thereby shortened, by the mentioned excessively rapid wear of the seating faces as represented at 20a, 21a. This is particularly true of the valve body seat face 20, in that the wearing down of it both takes away the rigid back-up of the seal 25 against the mentioned inward pressure deflection, and increases the gap or clearance between the metal faces 20, 21 that exists at the instant of the initial seal contact, and across which the seal is to resist the "pinch-off" producing force of the mentioned very high fluid pressure.

It will be understood that, so long as the surfaces or case hardened regions of the metal-to-metal engaging portions of the tapered valve body and seat faces have not worn away, the wear thereat, over the major life of the valve, proceeds apace with the seal surface wear, at the seal front face 26, whereby the degree or amount of the seal's protrusion remains essentially constant, and "pinch-off" occurs gradually, at a retarded rate.

Figure 4B:
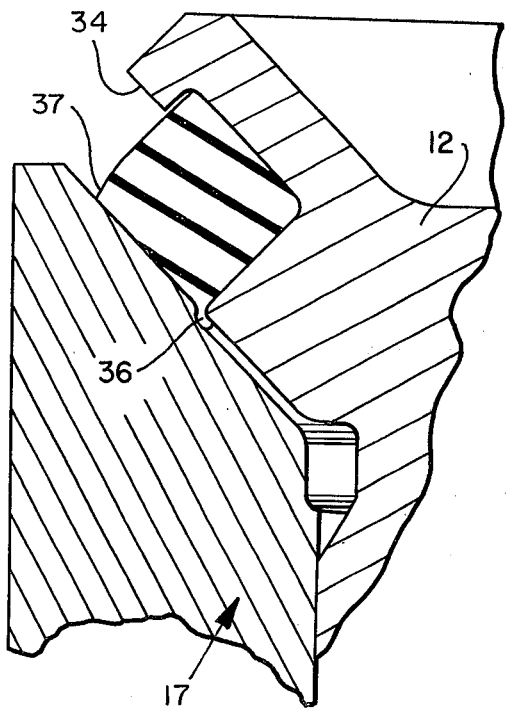
Figure 4C:
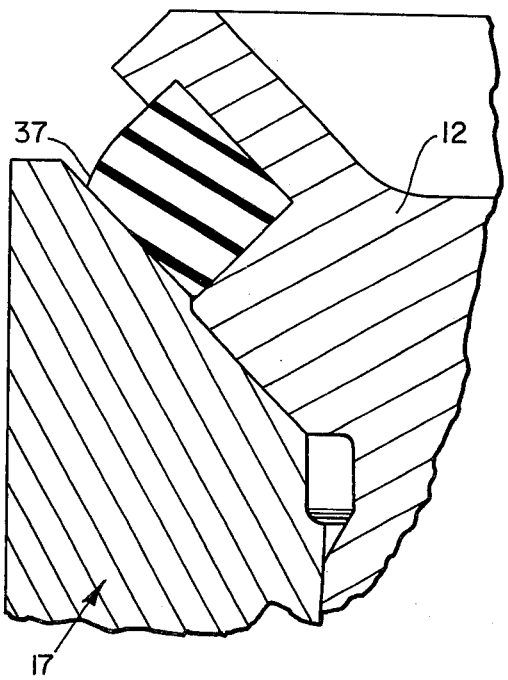

The "pinch-off" problem is further illustrated by FIGS. 4a, 4b, and 4c showing the valve and seal as subject to "pinch-off", and in initial seal engaged, partial seal compressed, and full valve closed positions respectively.

The valve is depicted more particularly in FIGS. 4a, 4b, and 4c as in that terminal life stage of deterioration wherein the hardened cases of the metal seating surfaces have worn away at 20a, 21a, wherein the metal wear rate has thereby become excessive, wherein the seal face 26 protrusion has thereby also become excessive, and whereby consequently a marked change to an increased or more rapid rate of "pinch-off" or chewing away of the valve seal has begun, as represented by the blunted or irregularly torn and reduced, lower inside seal corner 35.

In this FIG. 4 illustrated condition of the valve, with the excessive protrusion resulting in a yielding to or inward seal deflection under the very high fluid pressure above the valve, the inward seal flow, following the initial contact, FIG. 4a, that subjects the seal to the full force of the fluid pressure, is characterized by the fluid pressure's further forcing of the seal face 26 downwardly-inwardly, to the point, upon each valve closing, of forcing a further portion or segment 36 of the lower inside seal face or corner between the seating and seat faces 20a, 21a, which segment is nipped or chewed off on the full valve closing as shown, FIG. 4c, and with the result that the seal width at its front or seat engaging face 26 is gradually reduced, as represented by the increasing (FIG. 4b to FIG. 4c) inturning of the outer seal face 29 at the lower outside corner intersection 37 thereof with the thus narrowed seal face 26.

For the reasons above explained, this invention significantly postpones, or lengthens the working life of the valve before it reaches, the FIG. 4 depicted stage of deterioration, in which the "pinch-off" has progressed from the normal, gradual or retarded rate to the more rapid case-hardened wear-away rate, and in which, when a shortening or narrowing thereby of the seal face 26 has reached a critical point, say to less than half the seal width, the high fluid pressures will so distend or distort the seal 25 that it will no longer seal off.

It will also be understood that the hundreds of thousands of rapidly repeated compressings of the rubber seal, under such as the mentioned 100,000 pounds total pressure or load on top of the valve, causes the seal to soften, or lose some of that stiffness with which it initially fully resists the deflecting pressure.

Under this invention, then, and as above described, the initial stiffness of and with that the resistance to inward flowing of the seal is significantly increased, whereby the seal stands up against the "pinch-off", and, in thus non-distorting, seals off the pitting, cutting flow of the fluid, whereby the wearing away of the seating surface 20 behind the seal 25 is substantially slowed, and, more generally, the case-hardened wearaway is substantially postponed. The substantial lengthening of the normal wear life of the valve and seal serves in turn to postpone the onset of the more rapid "pinch-off", whereby the life of the seal, or its ability to seal off completely against any leakage of the abrasive, metal-cutting fluid, is additionally increased or lengthened.

Operational experience with the invention valve has also shown that it will withstand the high fluid pressures and suffer negligible "pinch-off" even after considered metal wear has occurred, and that it will continue to seal even after seal destructive "pinch-off", when that does occur, has progressed to 50% of the seal wear face, or even more.

The longer life of the invention seal, in combination with the minimizing or substantial showing of the metal seating faces wear, accords the invention valve about a 25% longer life in the pump. The elimination of the seat bore bridge and enabling thereby of a full opening valve, through reliance on the thickness of the seat to afford the valve seating and sealing, assigns to the invention valve also a substantially greater hydraulic efficiency.

I claim:

1. An improved valve for high speed pumps operating as fast as 200 revolutions per minute and more than three valve openings and closings per second, and subject to fluid pressure of as much as about 5,500 pounds per square inch, comprising
- an annular metal valve seat ring having an upwardly inwardly facing conically tapered flat seat face;
- a rigid, integral, annular, metal valve body mounted for reciprocation relative to and coaxially with said seat ring,
- said valve body having a downwardly outwardly facing, conically tapered flat seating face,
- said valve body seating face having the identical taper of and overlying the inner portion of said seat ring seat face;
- said valve body recessed outwardly of its said seating face to present thereat an annular seal groove,
- said seal groove having a rigid flat back wall of the same taper as said seat and seating faces, an at least partial outer side wall, and a flat inner side wall inclined substantially at right angles to said back wall;
- an annular, rubberous, rectangular-section seal ring in said seal groove,
- said seal ring dished to have front and back faces paralleling said seat and seating face taper, and parallel inside and outside faces inclined as said inner side wall of said groove,
- said seal ring having when relaxed an inside diameter critically less than the inside diameter of said groove, and whereby said ring is calculatedly prestressed in circumferential tension when seated in said groove,
- the depth of said seal ring exceeding the depth of said seal groove, and the front face of said seal ring overhanging said seating face of said valve body, such that compressing of said seal ring upon full closing of said valve cushions said valve closing and minimizes the wear on said tapered seat and seating faces,
- said seal ring pre-stressing in tension being sufficient both
- to stiffen said ring against flow under and "pinch-off" by said fluid pressure and
- to so accelerate the rate of elastic recovery of said seal ring beyond its relaxed rate as to achieve full shape recovery from seating compression within the about ⅓ seconds, or even less, time intervals between successive closings of said valve,
- said seat face of said valve seat ring extending upwardly beyond said valve body seal groove outer side wall whereby upon said valve closings said valve body seal ring fully engages said seat ring seat face and is uniformly compressed across its full width between said seat face and said rigid back wall of said valve body groove,
- the confining of said seal ring by said valve body groove back and inner side walls allowing only upward-outward expansion of said seal ring upon said valve closing,
- said groove outer side wall spaced apart from said groove inner side wall a distance sufficiently greater than the width of said ring to accommodate the upward-outward seal ring flow towards said outer side wall resulting from compression of the seal, upon said full valve closing to engage said seat and seating faces, that is uniformly over the entire cross-section of the seal,
- said outward seal flow being of the entire same seal amount as the overhang amount that is displaced upon the said full valve closing,
- said valve body having sufficient material about said annular seal groove to retain full rigidity and not deflect under the pressure thereagainst of said compressing of said seal,
- whereby the impact of said valve closing is absorbed and cushioned by said seal,
- and whereby said seal shape recovery goes entirely to restoring said overhanging,
- said undeflected seal cushioning and restoring substantially reducing wear of said tapered valve body and seat faces, and correspondingly slowing "pinch-off" of said seal.

2. The valve of claim 1, wherein the extent of the seal ring overhang is from about 1/32 in. to about 1/16 in.

3. The valve of claim 1, wherein the inside diameter of the unstressed seal ring is at least about ¼ in. less than the inside diameter of the groove.

4. The valve of claim 1, wherein the depth of the seal groove is about ½ in.

5. The valve of claim 1, wherein the taper of the seat and seating faces, the seal ring front and back faces, and the groove back face are all about 45°.

6. The valve of claim 1, wherein the seal ring groove is wider than the ring by an amount providing an initially void volume at least equal to the volume displaced from the seal ring overhang upon the full seating of the valve.

7. The valve of claim 1, wherein the seat ring seat face extends downwardly-inwardly to fully oppose the valve body seating face, and wherein said seat ring seat face extends upwardly-outwardly beyond the upward-outward expansion of the seal ring upon the valve closing.

8. The valve of claim 1, wherein the stiffening and recovery of it is such that the seal suffers negligible "pinch-off" even after considerable metal seat and seating face wear, and such that the valve continues to seal even after destructive "pinch-off" of the seal has progressed to 50% or more of the seal wear face.

* * * * *

UNITED STATES PATENT OFFICE
CERTIFICATE OF CORRECTION

Patent No. 4,076,212          Dated February 28, 1978

Inventor(s)   Arthur L. Leman

It is certified that error appears in the above-identified patent and that said Letters Patent are hereby corrected as shown below:

Column 1, line 17, after "say", delete "4" and insert --four (4)--.

Column 3, line 11, delete "At" and insert --at--.

Column 3, line 13, delete "where come" and insert --where it comes--.

Column 5, line 13, delete "3" and insert --3 in.--.

Column 5, line 46, delete "same" and insert --said--.

Column 6, line 42, delete "give away" and insert --give way--.

Column 8, line 18, delete "(FIG. 4b to FIG. 4c)" and insert --(from FIG. 4b to FIG. 4c)--.

Column 9, line 51, delete "seconds" and insert --second--.

Signed and Sealed this

Twenty-first Day of November 1978

[SEAL]

Attest:

RUTH C. MASON
Attesting Officer

DONALD W. BANNER
Commissioner of Patents and Trademarks